Figure 1:
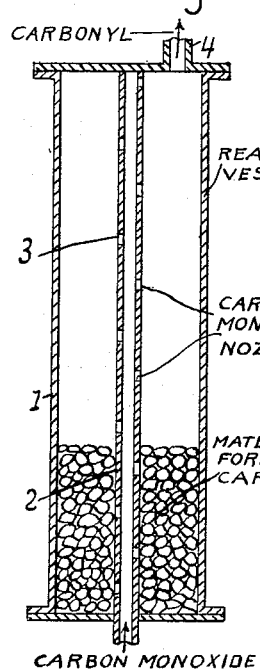

Dec. 26, 1933.  L. SCHLECHT ET AL  1,941,111
PRODUCTION OF METAL CARBONYLS
Filed April 4, 1931  2 Sheets-Sheet 1

INVENTORS
Leo Schlecht
Max Naumann
BY their ATTORNEYS
Hauff + Warland

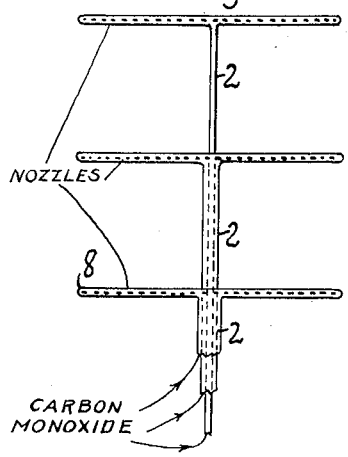
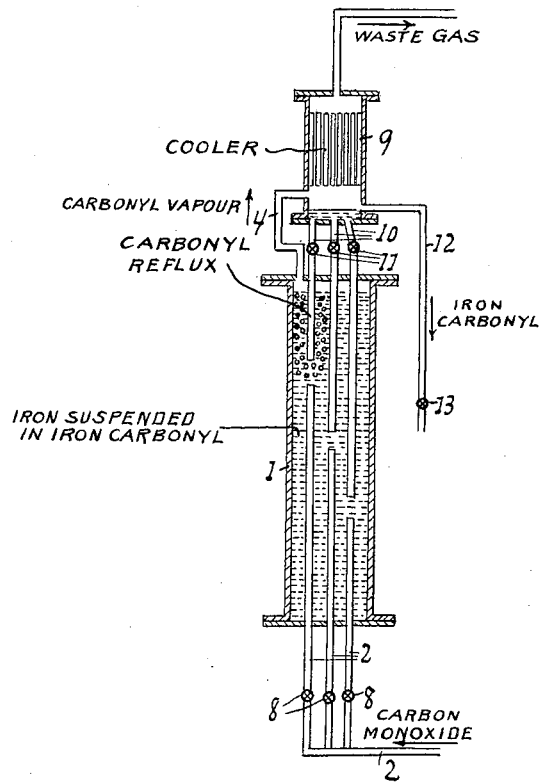
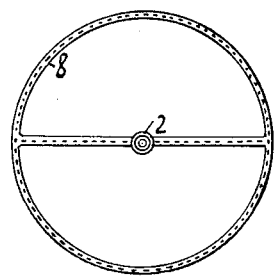
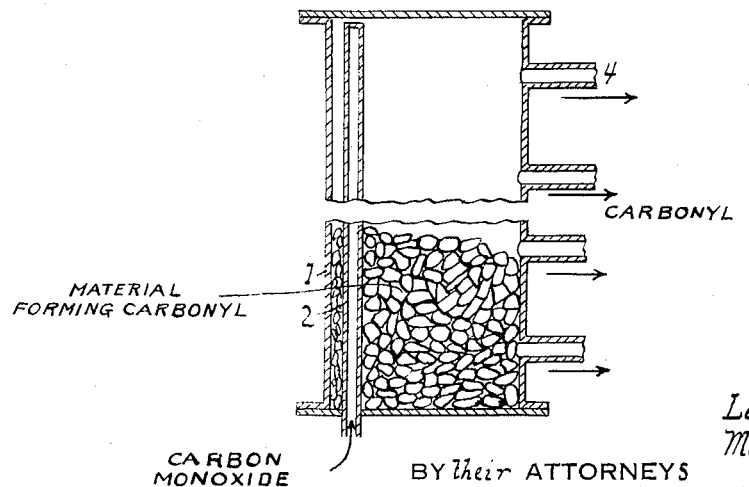

Patented Dec. 26, 1933

1,941,111

UNITED STATES PATENT OFFICE 1,941,111

PRODUCTION OF METAL CARBONYLS

Leo Schlecht and Max Naumann, Ludwigshafen-on-the-Rhine, Germany, assignors to I. G. Farbenindustrie Aktiengesellschaft, Frankfort-on-the-Main, Germany Application April 4, 1931, Serial No. 527,650, and in Germany April 7, 1930

19 Claims. (Cl. 23—203)

The present invention relates to improvements in the production of metal carbonyls and to improved apparatus therefor.

Metal carbonyls are prepared by acting with carbon monoxide or a gas containing carbon monoxide on a material comprising a metal capable of forming a metal carbonyl, usually at elevated temperatures and preferably under high pressure. If this process is carried out on an industrial scale, it is essential to obtain good yields per unit of time and space, since otherwise the reaction requires much time and very large and consequently expensive apparatus. It is also important to prevent inconvenience by reason of the decomposition of carbon monoxide, and with this object in view it is of particular importance, especially when working under pressure, to lead away the considerable heat disengaged by the reaction and rapidly and uniformly to obviate any fluctuations in temperature, even if they are only local fluctuations. In order to control the temperature in the reaction vessel, use may be made of special heating and cooling devices, such as coils or jackets, but these have the disadvantage that their action is slow and not sufficiently uniform, that they require space within the reaction vessel whereby reaction space is lost which is particularly inconvenient when working under pressure, and that they render it difficult to fill the reaction vessel and, in continuous operation, to pass the reacting materials through the vessel. Moreover, it has been observed that, when introducing the carbon monoxide into the reaction vessel by means of only one passage and also withdrawing it therefrom by only one passage, the carbon monoxide rapidly reacts with the metal in the neighbourhood of the gas inlet, but that its action decreases very soon, due to the equilibrium being attained; therefore large amounts of gas and carbonyl vapor must be conveyed through a large portion of the reaction vessel without any further formation of carbonyl taking place; in consequence of this phenomenon it takes a long time until the metal in the neighbourhood of the gas outlet enters into reaction.

We have now found a method of working by which the aforesaid disadvantages are overcome at least to a great extent, so that the process can successfully and economically be carried out on a large industrial scale. In the process according to the present invention use is made of a fluid conveyed through the reaction vessel which is supplied into, or withdrawn from, or both supplied into and withdrawn from, the reaction vessel at several places which are distributed preferably in several zones over the whole space within the reaction vessel.

The said fluids may be either gases or liquids. When gases are employed as the fluids, use is preferably made of the reaction gas itself, namely carbon monoxide or a gas containing the same. Use may also be made of inert liquids or melts, as for example organic substances, such as oils, paraffin wax and other hydrocarbons, or any other liquids which under the working conditions (concentration, pressure and temperature) employed do not substantially attack in an obnoxious manner the carbonyl forming material, the carbon monoxide and the carbonyl formed, may be employed. Liquids having high specific heats, as for example water, are especially suitable, as are also liquid or fused metal carbonyls. If desired, carbon monoxide is dissolved in these liquids beforehand.

It will be readily understood from the foregoing that the apparatus used according to the present invention consists of a suitable reaction vessel having a plurality of inlet and/or outlet devices for the fluid, which are preferably distributed in the interior of the reaction vessel not only over the length thereof but also over the cross-section thereof and are preferably constructed so that they may be supplied with differing amounts of fluid independently of each other. The number and special construction of the inlets and/or outlets may be different at different parts of the reaction vessel. They depend on the size and shape of the reaction chamber, on the nature, especially the reactivity, of the initial materials and on the working conditions employed, as for example whether the initial materials are treated with carbon monoxide in the dry state or in the presence of liquids. Thus, in the latter case a smaller number of gas supplies is as a rule sufficient, than when treating the initial materials in the dry state.

The nature of the apparatus used according to the present invention will now be further explained with reference to the accompanying drawings which illustrate diagrammatically arrangements of apparatus suitable for carrying out the invention, but the invention is not restricted to these arrangements.

When using carbon monoxide as the fluid, the simplest method is to employ a single pipe passed through the longitudinal axis of the reaction vessel and provided with openings or nozzles the size of which is selected according to the amounts of gas to be supplied to the single zones of the reaction vessel. An apparatus of this kind is illustrated in Figure 1 of the accompanying drawings, showing a cylindrical reaction vessel 1 having in its axis a pipe 2 with a plurality of openings 3 through which carbon monoxide is introduced into the vessel. The gas and the carbonyl vapors formed are withdrawn from the reaction vessel by a pipe 4. Instead of the perforated tube shown in the drawings, use may be made of a porous tube made for example by sintering copper powder or glass powder.

Figure 2:
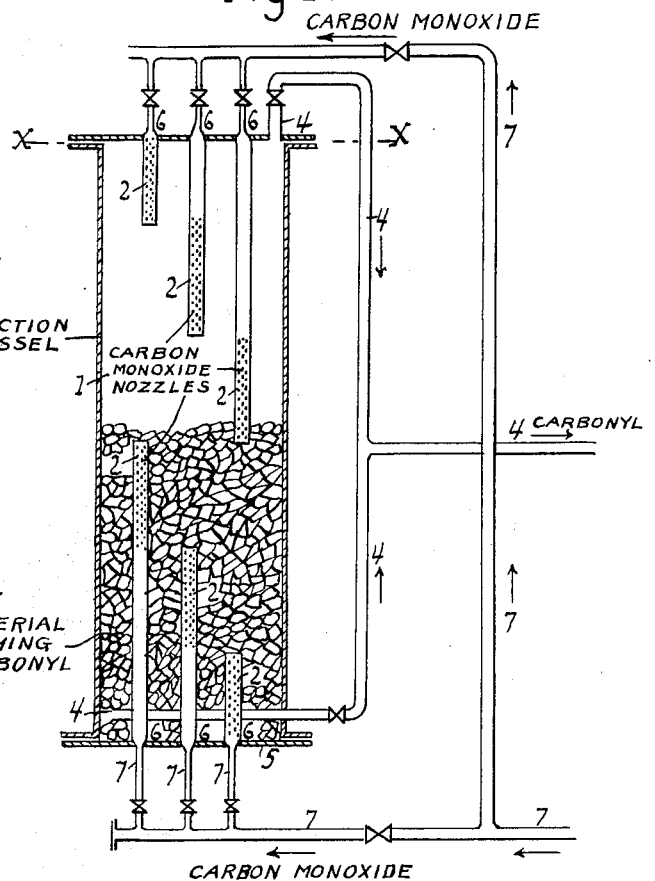
Figure 3:
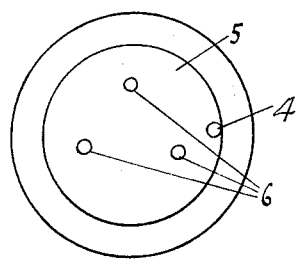

In order to be able to supply the single sections of the reaction vessel with regulatable, different amounts of gas independently of each other several inlet openings, and preferably also outlet openings, may be distributed at intervals in the wall of the reaction vessel over the whole surface thereof. Distributors or nozzles in the interior of the reaction vessel may be connected to the said openings if desired. Or several inlet and/or outlet pipes may be arranged within the reaction vessel. An apparatus of this kind is shown in vertical section in Figure 2 and in cross-section in Figure 3. A reaction vessel 1 of circular cross-section has two covers 5 each provided with three openings 6 to which pipes 2 in the interior of the reaction vessel 1 are connected. The pipes 2 serve for the supply of gas, are capable of being closed independently by valves and are all fed through pipes 7 by the circulating pumps and fresh gas pumps. They project different distances into the reaction vessel, are closed at their inner ends and are provided with a large number of openings or nozzles at the places at which the gas is to flow out. The withdrawal of the gases is effected through pipes 4. This arrangement, which has the special advantage that the inflowing gases, which are usually cool, are heated up before they enter the reaction chamber 1, especially in the longer tubes 2, is suitable either for working in the presence of liquids, as for example in continuous operation, or for working with gaseous carbon monoxide and reaction material in the form of pieces. In the former case the lower outlet at 4 is dispensed with and none of the pipes 2 should be quite free from a current of gas at any time so that clogging of the nozzles may be avoided.

It is also possible to so modify this arrangement that the gas is supplied from the axis of the reaction vessel. In this case several tubes are arranged concentrically one inside another in the longitudinal axis of the reaction vessel, the distribution of gas over the cross-section of the reaction vessel being effected by a device of the nature of a ring burner or by nozzles. The nozzles may have such a size and shape that the gas is introduced under a comparatively high pressure and with a high speed, thereby being supplied to a substantial portion of the reaction space. The nozzles may be arranged on one side only of the supply pipes, or they may be distributed more or less uniformly over the whole surface of the said pipes. When arranging them on one side only of the supply pipes and when the contents of the reaction vessel are in the liquid or pasty state, the said contents may be moved by the gas introduced. Alternatively, when the supply pipes are arranged movably, they may be caused to move, for example to rotate, by the gas. The aforesaid arrangement of the gas supply pipes in the centre of the reaction vessel is illustrated in Figure 4, the vessel itself not being shown for the sake of greater clearness. Figure 5 illustrates a view of the device shown in Figure 4. In this arrangement three supply pipes 2 concentrically arranged within each other are introduced into the reaction vessel. At their upper ends, which are at different levels, the said pipes are connected to distributing devices 8 similar in construction to a ring burner, which devices distribute the gas over the whole cross-section of the reaction vessel.

Figure 6 illustrates an apparatus in which the reaction is carried out in a liquid medium such as liquid metal carbonyl, and in which not only the carbon monoxide is supplied at several places of the reaction vessel, but also the liquid medium is introduced at several points. As illustrated in the said figure, a high pressure vessel 1 is filled with a suspension of iron in iron carbonyl. Carbon monoxide is introduced into the vessel under a pressure of 200 atmospheres by means of pipes 2 provided with control valves 8. The gases leave the reaction vessel by means of a pipe 4 and then pass through a cooler 9. The liquid iron carbonyl separated therein may be returned into the reaction vessel to the extent necessary with regard to the temperature in the reaction vessel by means of pipes 10 provided with control valves 11. The remainder of the liquid carbonyl is removed from the cooler by way of a pipe 12 and a discharge valve 13. The amount of gas supplied into the vessel is proportioned so that sufficient carbonyl is vaporized to prevent the paste within the reaction vessel being too greatly diluted.

In the apparatus shown in Figure 7, the high pressure vessel 1 is supplied with initial material in lump form. Carbon monoxide is introduced by means of the porous tube 2. The gas containing carbonyl vapor is withdrawn by means of a number of pipes 4.

It will now be readily understood that the apparatus described in the foregoing are only typical examples, and that the constructional details may be modified in many respects without departing from the scope of the present invention.

The process according to the present invention involves quite a number of advantages over the methods hitherto practiced in the manufacture of metal carbonyls.

Thus, when supplying the carbon monoxide, whether as such or in the form of a solution in a suitable liquid, in the manner hereinbefore specified the reaction proceeds practically uniformly throughout the whole reaction space, so that the throughput in a vessel of given size is much greater than when supplying the carbon monoxide by only one inlet at one side of the reaction vessel and withdrawing it by only one outlet at the other side, as has been hitherto usual.

Furthermore, the use of the fluids in the manner specified renders it possible to effectively control the temperature at each place or zone within the reaction vessel, by suitably varying the amount and temperature of the fluid supplied to each zone.

Thus, if a gaseous fluid, for example carbon monoxide is used, and if for example the temperature in one or more zones of the reaction space is too high, the reaction gas is supplied to the said zones with a suitably lower temperature and in an appropriate amount; the gas is heated within the vessel, thereby cooling the latter, and after leaving the vessel it is passed through a suitable cooler, where it is cooled to the desired temperature, and is then reintroduced into the vessel in a circular course, preferably without releasing the pressure. For overcoming an undesirable fall of the temperature in the reaction zones, the reaction gas is used in a similar manner, but with a suitably higher temperature. Especially for the purpose of cooling, other inert gases, as for example hydrogen, nitrogen and carbon dioxide, may be employed instead of the reaction gas; in this case the cooling action is particularly strong, because the reaction gas is diluted and the reaction thereby retarded, so that less heat is disengaged. When using liquids as the fluids, these are employed in a similar manner.

Contrary to expectation, the yields per unit of time and space do not suffer by working in this manner, but are considerably improved by reason of the rapid and uniform regulation of the temperature. The difference between the temperature of the gases or liquids and the temperature of the reaction vessel may be readily adapted to suit the requirements. In order to avoid considerable speeds of flow in the reaction vessel, the said difference in temperature is advantageously chosen fairly great; the difference is limited however by the facts that at too high temperatures decomposition of the carbon monoxide takes place and that there is a danger that the cold gas or liquid introduced may bring the reaction to a standstill first at the inlet and then throughout the reaction vessel.

Of course, the different currents of flowing media may be at different temperatures and at different speeds independent of each other. In this manner the danger that the contents of the reaction vessel may become too cold or too hot locally is to a large extent avoided so that the fluids in this case may even be strongly cooled for example, and each zone of the reaction space may be heated or cooled as desired, independently from other portions of the reaction space. The fluids may be introduced for example by means of a pump.

Before their entry into the reaction vessel, liquid fluids are preferably more or less saturated with carbon monoxide, advantageously under the pressure prevailing in the reaction vessel, and this is especially to be recommended when employing liquid or fused carbonyls as the liquid fluids in order to avoid decomposition. The liquid fluids introduced for the purpose of cooling may be more or less completely converted into the vapor phase in the reaction vessel; in this case heat is withdrawn not only by the heating of the liquid to the temperature of the reaction vessel but also by the evaporation thereof. The vapors formed are preferably condensed again at a suitable place outside the reaction vessel and may be returned to the reaction vessel when desired.

The following example will further illustrate the employment of vaporizable liquids as the flowing media, but the mode of operation is not restricted to this particular example.

Carbon monoxide is caused to flow under pressure upwards through a vertical high pressure vessel filled with a suspension of iron in iron carbonyl. The vessel is provided with a reflux condenser in which the carbonyl vapor carried along by the escaping current of gas is more or less liquefied, depending on the cooling temperature in the condenser, and from which the liquefied carbonyl flows back cooled into the vessel. The refluxed carbonyl is introduced into the vessel at different places through a number of submerged pipes, which if desired may be closable by means of valves. It is not necessary, however, to return the whole of the carbonyl liquefied in the reflux condenser to the reaction vessel for cooling purposes. In this case the cooling temperature in the condenser may be kept continually constant because the amount of carbonyl refluxed is limited by the amount otherwise led off. The amount of liquid vaporized at any particular place in the vessel for the purpose of cooling, and therefore the intensity of the cooling, may be regulated by the amount of gas supplied at that place because the gas must become saturated with the vapor. It is therefore of especial advantage not only to distribute the inlets, and if desired also the outlets, for the liquid throughout the vessel but also to provide for several inlets and outlets for the gas. In some cases the vaporization may be effected so rapidly that the liquid introduced is immediately converted into the gaseous or vaporous phase and the liquid as such is only present at the most for only a short time in the vessel.

Instead of a reflux condenser, any other kind of cooler may be employed for the condensation of the liquids vaporized in the vessel. In cases when the introduction of the condensed carbonyl or other liquid employed cannot be carried out directly, as for example by reason of difference in level, it may be effected by means of a pump. In any case it is advantageous that the liquid serving for cooling or heating should remain within the reaction system because it is then always saturated with the reaction gas and does not have to be brought to the reaction pressure.

Instead of or in addition to vaporizable liquids, difficultly volatile liquids may be employed, or a part only of the vaporizable liquid may be vaporized. The liquids as for example oils, carbonyls in the liquid phase and the like, or pastes consisting of the liquids concerned and fine-grained materials capable of forming carbonyls, are preferably led in circulation, without releasing the pressure, on the one hand through the vessel charged with the reaction material and on the other hand through a suitably efficient heat exchanger. With the aid of distributing means for the introduction and/or withdrawal, any desired amount of liquid may be allowed to enter any part of the vessel whereby a particularly intensive cooling or heating effect is brought about. In many cases the circulation may be effected without special driving means, in that the liquid becomes heated in the vessel and ascends therein, passes to the cooler, sinks therein by reason of the increase in specific gravity caused by the cooling, and enters the vessel again. In heating processes the said circulation takes place in the opposite direction.

It is particularly advantageous in the process according to the present invention to combine the temperature control by means of liquid fluids with that by means of gaseous media.

The heat withdrawn from the reaction chamber by the fluids is preferably taken up in a suitable manner in appropriate apparatus and rendered useful, as for example for the production of high pressure steam.

A special advantage of the process according to the present invention consists in the fact that the apparatus which serve for the absorption of the heat is to be withdrawn or for the supply of the heat to be supplied may be more or less spatially separated from the apparatus serving for the formation of carbonyl and not combined therewith as in other processes in which a cooling apparatus is arranged on or in the reaction vessel. In this manner the apparatus which serve to take up the heat of the flowing media leaving the vessel, may have a construction as suitable as possible for the withdrawal of heat, whereby the utilization of the heat, as for example the production of high pressure steam with the employment of the counter-current principle is considerably facilitated. In order to facilitate the transfer of heat in the cooling or heating apparatus the outer cooling or heating medium may be employed under the pressure which prevails in the apparatus itself so that only thin separating walls are necessary. For example when working under a pressure of 200 atmospheres the cooling water is pressed through the cooling plant under a pressure of 200 atmospheres or a pressure deviating only slightly therefrom.

It is especially advantageous to render the withdrawn heat useful in the processes of the preparation and working up of the carbonyls themselves, as for example to use up the heat in the preparation of the substances forming carbonyls, for example for preheating the initial material prior to reduction and if desired also for preheating the gases employed for the reduction; or the heat may be utilized in the thermal decomposition of metal carbonyls for preheating the heating gases and for vaporizing the carbonyls as well as in the further working up of the metals thereby obtained. For example cold liquids may be passed through the reaction chamber for removing heat therefrom and withdrawn in the hot state, and their contents of heat may then be utilized in the said processes which use up heat. The liquid carbonyl in a hot state, if desired superheated, may be led for example to the vaporizer of the decomposition apparatus for producing free metals from the carbonyl so that it need not further be heated therein. A particularly advantageous utilization of the waste heat when using gases as the fluids is when the hot gases are employed directly as such, as for example when hot carbon monoxide is to be led into the hollow space of the vessel in which the decomposition of carbonyls is carried out, in that the hot gases are withdrawn from the container in which the formation of carbonyl takes place and are supplied directly for the desired purpose.

In some cases it may be preferable not to effect the temperature regulation solely by fluids, namely gases or liquids or both, but to use special cooling and heating devices, such as spirals, pipes, jackets, ribs and the like in conjunction therewith. For example the more intensive regulation of temperature may be effected with such devices while the finer regulation of temperature may be effected by the fluids, preferably the reaction gases. The heating and cooling devices are then preferably so arranged that single zones of the reaction vessel may be influenced independently of each other, as for example by providing several separate pipe systems, cooling chambers and the like.

The cooling and heating of the fluids may be effected in the usual manner. In some cases it is advantageous to withdraw the fluids to be employed from other reaction vessels or systems serving for the preparation of carbonyls. Thus for example for heating the carbonyl-forming material, the hot liquids from a reaction vessel in full operation may be led to the carbonyl-forming material whereby the latter is heated and the liquids which have thus been cooled may then be returned to the reaction vessel in order to withdraw further amounts of heat. In a similar manner the several liquids from different reaction vessels may be brought into heat exchanging relation to each other.

When operating several reaction vessels simultaneously it is also advantageous to cool the hot gases of one reaction vessel by means of the cold gases of another reaction vessel, whereby the heat requirements of one reaction vessel are supplied by another. When both reaction vessels are operated under the same pressure, the walls of the heat exchanger may be very thin. The reaction vessels may also be arranged one behind the other, the hot gases from one being passed into the next.

If, when using gases as the fluids, it is necessary, as for example in cases in which an immediate strong cooling is essential, to effect the cooling with gases other than the reaction gases, as for example with inert gases which displace the reaction gases and therefore are capable of bringing the reaction to a standstill, it is advantageous to employ inert gases which are easily removed or which, together with the reaction gases, form a mixture which is suitable for other purposes.

The process according to the present invention is of particular advantage when used in connection with reaction vessels in which the mean diameter is only small as compared with the length of the vessel; such vessels may have a length which is for example 10 or 20 or even more times as great as their mean diameter.

The features according to the present invention may of course be applied also to such modes of operation wherein the initial material is conveyed through a plurality of reaction vessels arranged in series.

What we claim is:

1. In the production of a metal carbonyl by acting with carbon monoxide in a confined reaction space on a material comprising a metal capable of forming a carbonyl, the steps which comprise supplying a fluid into, and withdrawing it from, said reaction space, at least one of said steps of supplying and withdrawing taking place in a plurality of zones of said reaction space.

2. In the production of a metal carbonyl by acting with carbon monoxide in a confined reaction space on a material comprising a metal capable of forming a carbonyl, the steps which comprise supplying a fluid into, and withdrawing it from, said reaction space, at least one of said steps of supplying and withdrawing taking place in a plurality of zones of said reaction space and with a regulable amount of the fluid for each zone.

3. In the production of a metal carbonyl by acting with carbon monoxide in a confined reaction space on a material comprising a metal capable of forming a carbonyl, the steps which comprise supplying a fluid into, and withdrawing it from, said reaction space, at least one of said steps of supplying and withdrawing taking place in a plurality of zones of said reaction space and with a regulable amount and temperature of the fluid for each zone.

4. In the production of a metal carbonyl by acting with carbon monoxide in a confined reaction space on a material comprising a metal capable of forming a carbonyl, the steps which comprise supplying a fluid into, and withdrawing it from, said reaction space, said step of supplying taking place in a plurality of zones of said reaction space.

5. In the production of a metal carbonyl by acting with carbon monoxide in a confined reaction space on a material comprising a metal capable of forming a carbonyl, the steps which comprise supplying a fluid into, and withdrawing it from, said reaction space, said steps of supplying and withdrawing taking place in a plurality of zones of said reaction space.

6. The process as claimed in claim 1, in which the fluid is a gas.

7. The process as claimed in claim 1, in which the fluid is a gas comprising carbon monoxide.

8. The process as claimed in claim 1, in which the fluid is a liquid.

9. The process as claimed in claim 1, in which the fluid is a liquid metal carbonyl.

10. The process as claimed in claim 1, in which the material acted upon with carbon monoxide comprises iron.

LEO SCHLECHT.
MAX NAUMANN.